US012591287B2

(12) United States Patent
Rizvi et al.

(10) Patent No.: US 12,591,287 B2
(45) Date of Patent: Mar. 31, 2026

(54) WORKLOAD BASED GRAPHICS PROCESSING UNIT (GPU) PERFORMANCE ADJUSTMENT FOR ENERGY EFFICIENCY

(71) Applicant: DELL PRODUCTS L.P., Round Rock, TX (US)

(72) Inventors: Danial Ali Rizvi, Round Rock, TX (US); Vaishnavi Suchindran, Bengaluru (IN); Anand Singh Bisen, Round Rock, TX (US); Ravi Shekhar Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/637,787

(22) Filed: Apr. 17, 2024

(65) Prior Publication Data

US 2025/0328180 A1 Oct. 23, 2025

(51) Int. Cl.
*G06F 1/32* (2019.01)
*G06F 1/3206* (2019.01)
(52) U.S. Cl.
CPC .................................. *G06F 1/3206* (2013.01)
(58) Field of Classification Search
CPC ..................................................... G06F 1/3206
See application file for complete search history.

(56) References Cited

U.S. PATENT DOCUMENTS

2009/0113221 A1* 4/2009 Holle ........................ G06F 1/26
                                                                   713/310
2012/0324248 A1* 12/2012 Schluessler ........... G06F 9/5094
                                                                   713/300
2020/0019230 A1* 1/2020 Rong ...................... G06F 1/324

* cited by examiner

*Primary Examiner* — Stefan Stoynov
(74) *Attorney, Agent, or Firm* — Jackson Walker L.L.P.

(57) ABSTRACT

Techniques for improving energy efficiency in a distributed system including a plurality of processing units are described. One example method includes configuring an initial power limit for each processing unit in the distributed system; initiating processing of a workload by plurality of processing units in the distributed system, wherein the workload is associated with a target workload performance level; and during the processing of the workload: identifying a peak workload performance level associated with the processing of the workload based on telemetry data received from the plurality of processing units in the distributed system; determining that the peak workload performance level is less than the target workload performance level; and in response to determining that the peak workload performance level is less than the target workload performance level, configuring an increased power limit for at least a portion of the processing units in the distributed system.

20 Claims, 3 Drawing Sheets

WORKLOAD BASED GRAPHICS PROCESSING UNIT (GPU) PERFORMANCE ADJUSTMENT FOR ENERGY EFFICIENCY

TECHNICAL FIELD

The present disclosure relates in general to information handling systems, and more particularly to techniques for adjusting the performance of graphics processing units (GPUs) based on workload to improve energy efficiency in information handling systems.

BACKGROUND OF THE INVENTION

Graphics processing units (GPUs) are special purpose processors originally designed to perform operations specific to graphical applications, such as calculations necessary for rendering three-dimensional graphical objects from various perspectives in a virtual scene. In recent years, GPUs have been used extensively in artificial intelligence (AI) applications, for example, in the training of AI models such as the large language models (LLMs) used by many modern AI systems. This is due to overlap between the types of calculations performed in graphical applications and training AI models, such as, for example, matrix operations. GPUs are optimized for such calculations, and can generally perform these calculations faster and more efficiently (e.g., with less power consumption) than standard central processing units (CPUs). In some cases, large distributed systems may utilize hundreds or thousands of GPUs in parallel to enable models to be trained on large amounts of training data in a manageable amount of time.

SUMMARY OF THE INVENTION

In accordance with embodiments of the present disclosure, a method for improving energy efficiency in a distributed system including a plurality of processing units includes configuring an initial power limit for each processing unit in the distributed system; initiating processing of a workload by plurality of processing units in the distributed system, wherein the workload is associated with a target workload performance level; and during the processing of the workload: identifying a peak workload performance level associated with the processing of the workload based on telemetry data received from the plurality of processing units in the distributed system; determining that the peak workload performance level is less than the target workload performance level; and in response to determining that the peak workload performance level is less than the target workload performance level, configuring an increased power limit for at least a portion of the processing units in the distributed system, wherein the increased power limit is greater than the initial power limit.

In some cases, the processing unit may be a graphics processing unit (GPU), a tensor processing unit (TPU), or a data processing unit (DPU).

In some cases, the workload is a training task for an image processing model, and the target workload performance level is a number of images processed per second.

In some implementations, the workload is a training task for a large language model (LLM), and the target workload performance level is a number of tokens processed per second.

In some implementations, the workload is a first workload, the target workload performance level is a first target workload performance level, and the method further includes configuring the initial power limit for each processing unit in the distributed system; initiating, by a computing device, processing of a second workload by plurality of processing units in the distributed system, wherein the second workload is associated with a second target workload performance level; during the processing of the second workload:

identifying a peak workload performance level associated with the processing of the second workload; determining that the peak workload performance level associated with the processing of the second workload is greater than the second target workload performance level; and in response to determining that the peak workload performance level is greater than the second target workload performance level, configuring a decreased power limit for at least a portion of the processing units in the distributed system, wherein the decreased power limit is less than the initial power limit.

In some implementations, the method further includes in response to determining that the peak workload performance level is less than the target workload performance level, modifying a scheduling configuration for the processing of the workload to reassign at least a portion of the workload that is being processed by a first processing unit that is operating at a power level near the initial power limit to a second processing unit that that is operating at a power level below the initial power limit.

In accordance with embodiments of the present disclosure, a system for improving energy efficiency in a distributed system including a plurality of processing units includes configuring an initial power limit for each processing unit in the distributed system; initiating processing of a workload by plurality of processing units in the distributed system, wherein the workload is associated with a target workload performance level; and during the processing of the workload: identifying a peak workload performance level associated with the processing of the workload based on telemetry data received from the plurality of processing units in the distributed system; determining that the peak workload performance level is less than the target workload performance level; and in response to determining that the peak workload performance level is less than the target workload performance level, configuring an increased power limit for at least a portion of the processing units in the distributed system, wherein the increased power limit is greater than the initial power limit.

In accordance with embodiments of the present disclosure, an article of manufacture includes a non-transitory, computer-readable medium having computer-executable instructions thereon that are executable by a processor of a computer system to perform operations for improving energy efficiency in a distributed system including a plurality of processing units includes configuring an initial power limit for each processing unit in the distributed system; initiating processing of a workload by plurality of processing units in the distributed system, wherein the workload is associated with a target workload performance level; and during the processing of the workload: identifying a peak workload performance level associated with the processing of the workload based on telemetry data received from the plurality of processing units in the distributed system; determining that the peak workload performance level is less than the target workload performance level; and in response to determining that the peak workload performance level is less than target workload performance level, configuring an increased power limit for at least a portion of the processing units in the distributed system, wherein the increased power limit is greater than the initial power limit.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE SEVERAL VIEWS OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
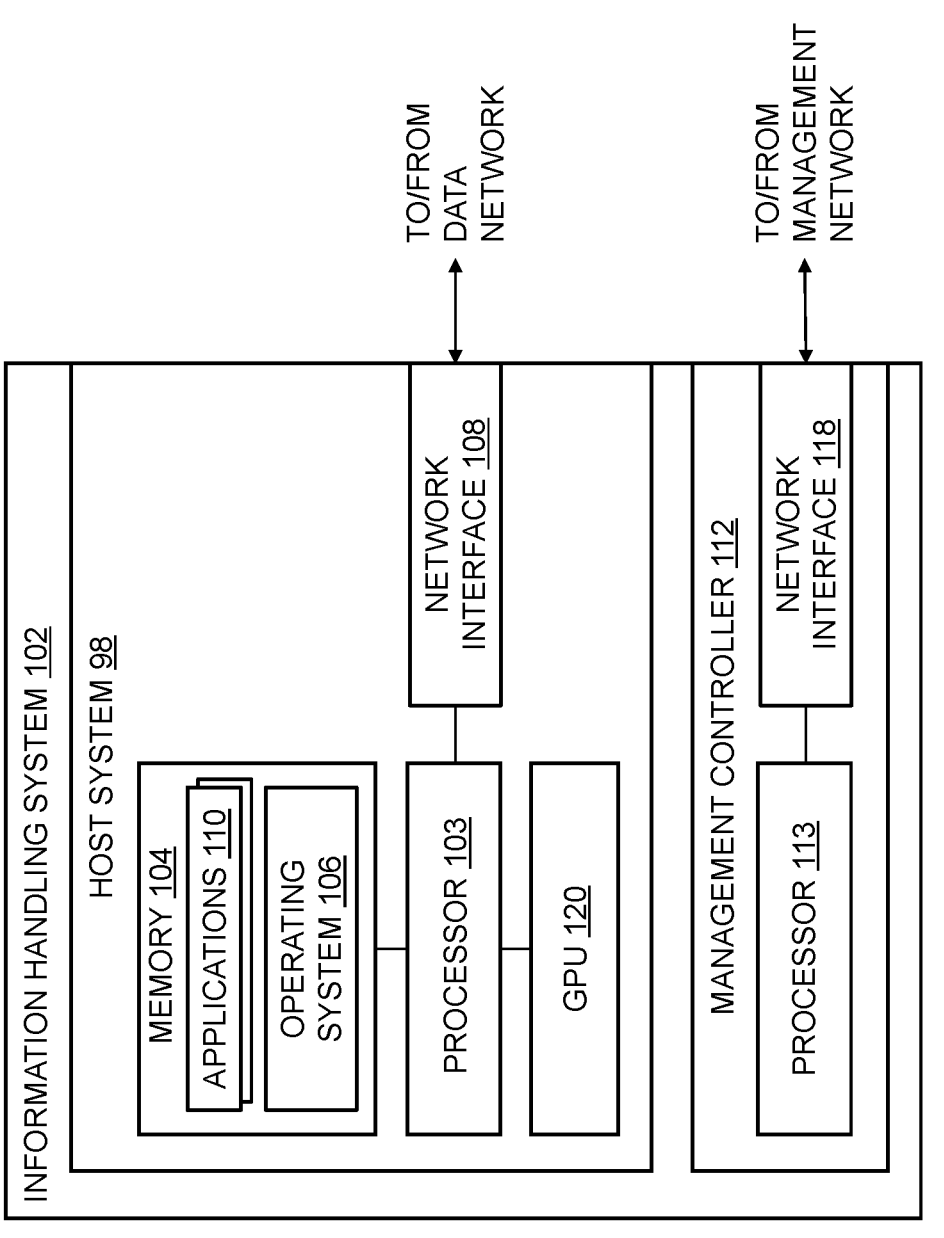
FIG. 1 illustrates a block diagram of an example information handling system, in accordance with embodiments of the present disclosure.

The present disclosure describes techniques for adjusting the performance of GPUs based on workload to improve energy efficiency in information handling systems.

As discussed above, many data-intensive computing applications, such as, for example, training AI models, utilize large numbers of GPUs to process large datasets. Generally, the GPUs are included in servers located in a datacenter or multiple datacenters and connected by a communications network. A processing task or "workload" will generally be divided into portions that can be processed in parallel, and these portions will be provided to the servers and processed in parallel by the GPUs included therein. For the purposes of the present disclosure, the term "graphics processing unit" or "GPU" also encompasses other dedicated processing units designed to process particular types of data, such as, for example, tensor processing units (TPUs), data processing units (DPUs), and the like.

Such configurations can present challenges to efficient datacenter resource management and scalability. The type of intensive data processing performed by the GPUs in such configurations can lead to high-power consumption and resultant high temperatures in the GPUs themselves and in other server components. Power consumption and temperature of a GPU generally increases as utilization increases. Such high temperatures may necessitate increased cooling fan activity to avoid thermal trips or power breakdowns. In addition, high temperature operation may result in device and hardware degradation, and additional hardware expense.

Accordingly, operating a GPU at a lower utilization will generally lead to decreased power consumption and operating temperature, but will also lead to decreased performance (e.g., lower data throughput). Achieving an equilibrium between performance and energy efficiency in GPUs under load is desirable.

The present disclosure describes techniques for adjusting the power consumption characteristics and workload assignments of GPUs in real-time during processing based on telemetry data provided by the GPUs. Such telemetry data may include data for current GPU power usage and temperature, current GPU and system fan power usage, the current performance of the GPU, and the configured power limits of the GPU. The techniques enable management of distributed systems including large numbers of GPUs, and may also take into account the power and thermal profile of the datacenter or datacenters in which the GPUs (and the server containing them) are located.

When the power consumption of a GPU approaches its thermal design power (TDP), performance gains obtained by increased power consumption diminish. For example, a modest reduction of 10-20% in GPU power consumption yields only a marginal 2.5-7.5% decrease in performance. In addition, fan power consumption for higher performance increases exponentially based on fan speed. Further, GPU performance also varies depending of the type of processing task. By effectively distributing workloads across available GPUs, it is possible to deliver high performance while adhering to the designated power and thermal profiles of the individual GPUS.

The present techniques involve utilizing server telemetry data including GPU temperature, fan power, fan speed, and recommended power profiles to assess the current operating state of the server, the included GPU or GPUs, and the distributed system as whole. A cloud-based workload distributor manages workload distribution across GPUs within the server and throughout the datacenter. An adaptive power tuner within the cloud environment to dynamically fine-tunes GPU power limits, ensuring that each server maintains its overall power and thermal balance. An adaptive workload tuner intelligently distributes workloads among the multiple GPUs to preserve an existing workload balance. The power and workload tuner components are integrated to achieve the required performance levels while simultaneously preserving power efficiency within the server infrastructure. Accordingly, the system optimizes GPU resource management by efficiently balancing power, performance, and workload distribution in cloud-based server environments.

Figure 2:
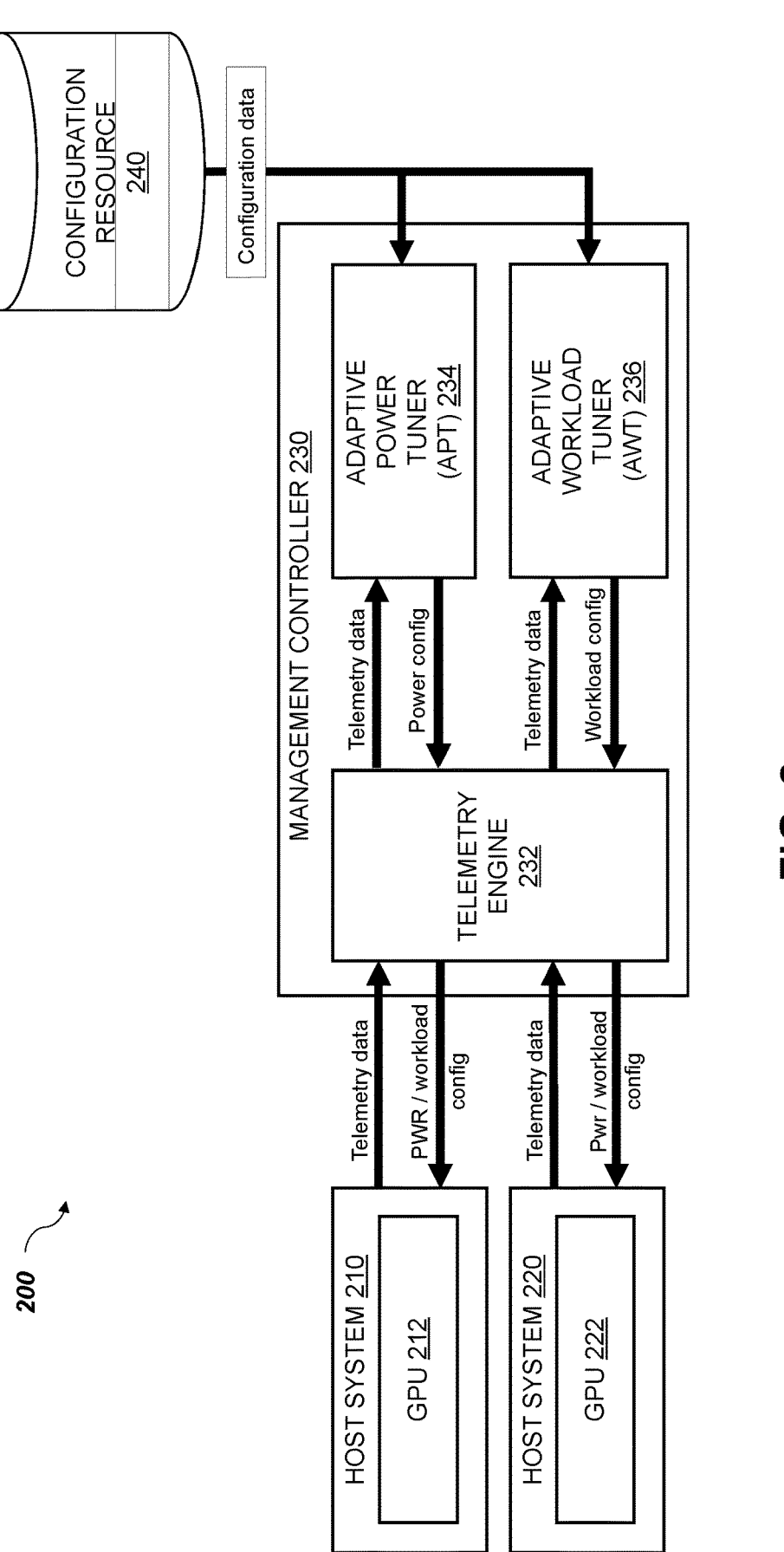
FIG. 2 illustrates a block diagram of example components of a system for adjusting the performance of processing units based on workload to improve energy efficiency, in accordance with embodiments of the present disclosure.
Figure 3:
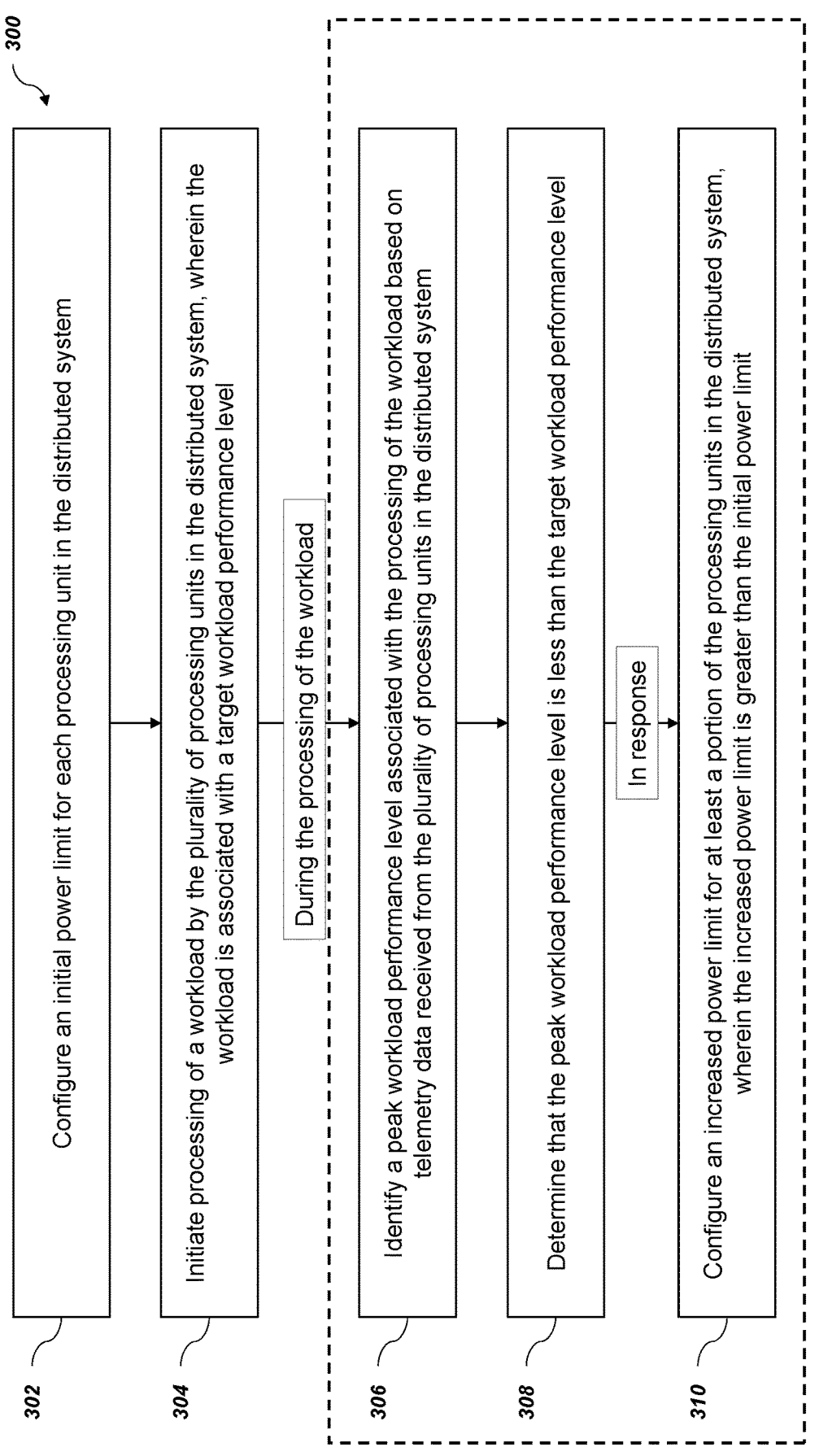
FIG. 3 illustrates a flow chart of an example process for adjusting the performance of processing units based on workload to improve energy efficiency, in accordance with embodiments of the present disclosure.

Preferred embodiments and their advantages are best understood by reference to FIGS. 1 through 3, wherein like numbers are used to indicate like and corresponding parts.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, a graphics processing unit (GPU) 120 communicatively coupled to processor 103, and a management controller 112 communicatively coupled to processor 103 (e.g., via a management network).

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or configured to interpret and/or execute program apparatus instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

GPU 120 may include one or more processing units configured to perform particular types of computations, such as, for example, operations on matrices or vectors of data that are common in AI applications. As noted above, these processing units may include GPUS, TPUs, DPUs, and the like, or any combination of these types. In operation, the processor 103 may utilize the GPU 120 for such calculations rather than performing the calculations itself. In some cases, the GPU 120 may be communicatively coupled to memory 104 (discussed below), and may read or write data directly to the memory 104 when performing calculations.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

FIG. 2 illustrates a block diagram of example components of a system 200 for adjusting the performance of processing units based on workload to improve energy efficiency, in accordance with embodiments of the present disclosure. As shown, the system 200 includes host systems 210, 220, a management controller 230, and a configuration resource 240, all of which are communicatively coupled (e.g., via a communications network or networks, not shown). Host systems 210, 220 include GPUs 212, 222, respectively. Management controller 230 includes a telemetry engine 232, an adaptive power tuner (APT) (234), and an adaptive workload tuner (236).

Host systems 210, 220 provide telemetry data to telemetry engine 232 of the management controller 230. Such telemetry data may represent the current operating state of each host system 210, 220, the GPUs 212, 222, or of other components included in the host systems 210, 220. For example, the telemetry data may include, but is not limited to, GPU temperature, GPU power consumption, GPU fan power consumption, GPU fan speed, server temperature (e.g., overall operating temperature of the particular host system), server power consumption, server fan power consumption, server fan speed, or other data related to the current operating state of the host system, or the included GPU or GPUs. In some implementations, the telemetry data may be provided by the host systems 210, 220 utilizing a network management protocol, such as, for example, Simple Network Management Protocol (SNMP), or any other suitable protocol.

In some cases, the telemetry engine 232 may be a software program executed by the management controller and configured to receive, parse, and interpret the telemetry data provided by the host systems 210, 220. In some implementations, the telemetry engine 232 may be implemented as a hardware component, such as a dedicated processor or server configured to perform the operations described above. As shown, the telemetry engine 232 provides the received telemetry data from the host systems 210, 220 as input to adaptive power tuner (APT) 234 and adaptive workload tuner (AWT) 236.

Configuration resource 240 stores configuration data for the various host systems (e.g., 210, 220) and the GPUS (e.g., 212, 222) included therein. In some cases, the configuration data may include an inventory of host systems currently managed by the management controller 230. The configuration data may include information on the GPUs (e.g., 212, 222) included in the host systems, including, but not limited to, the type, manufacturer, and model of each GPU, the currently configured power consumption limit for each GPU, and the like. The configuration data may also include current measurements of various attributes of the system as a whole (e.g., overall system performance/data throughput), or of a datacenter containing host systems 210, 222 (e.g., current ambient temperature of the datacenter). As shown, configuration resource 240 provides this configuration data as input to adaptive power tuner (APT) 234 and adaptive workload tuner (AWT) 236.

As shown, the management controller 230 also includes adaptive power tuner (APT) 234. APT 234 may be a software program executed by the management controller and configured to receive as input telemetry data provided by the host systems 210, 220, and configuration data provided by the configuration resource 240. In some implementations, the APT 234 may be implemented as a hardware component, such as a dedicated processor or server configured to perform the operations described above.

In operation, APT 234 may analyze the telemetry data and configuration data for the host systems 210, 220 and the GPUs 212, 222, and in response may selectively adjust a power consumption limit of the GPUs 212, 222. For example, the APT 234 may determine that GPU 212 is operating in a high temperature range; that decreasing the power consumption limit for GPU 212 will lower its operating temperature into an acceptable range; and that the reduction in the performance of GPU 212 as a result of decreasing the power consumption limit is acceptable. In response, the APT 234 may generate a power configuration message to be sent to GPU 212 to lower its power consumption limit. The APT 234 may then send this power configuration message to host server 210 (which contains GPU 212) via the telemetry engine 232, as shown in FIG. 2. The host server 210 may receive the power configuration message, and may update the power consumption limit of the GPU 212 in response.

In some implementations, the APT 234 may analyze telemetry and configuration data for many different GPUs in a distributed system managed by the management controller 230. In such a configuration, the APT 234 may send power configuration messages to different host servers to adjust the power consumption limit of different GPUs based on telemetry and configuration data particular to each GPU.

As shown, the management controller 230 also includes adaptive workload tuner (AWT) 236. AWT 236 may be a software program executed by the management controller and configured to receive as input telemetry data provided by the host systems 210, 220, and configuration data provided by the configuration resource 240. In some implementations, the AWT 236 may be implemented as a hardware component, such as a dedicated processor or server configured to perform the operations described above.

In operation, AWT 236 may analyze the telemetry data and configuration data for the host systems 210, 220 and the GPUs 212, 222, and in response may selectively adjust workload scheduling the GPUs 212, 222. For example, while the system 200 is processing a particular workload, the AWT 236 may determine that GPUs 212, 222 have the same configured power consumption limit, but that GPU 212 is obtaining better performance than GPU 222 for the current workload. In response, the AWT 236 may generate workload configuration messages to be sent to GPUs 212 and 222 to shift a portion of the workload assigned to GPU 222 to GPU 212. Such a shift may have the effect of better balancing the processing workload between GPUS 212, 222, thus leading to a more efficient system. The AWT 236 may then send this workload configuration message to host servers 210, 220 (which contain GPU 212, 222) via the telemetry engine 232, as shown in FIG. 2, in order to redistribute the processing workload.

In some cases, the AWT 236 may effectively rebalance processing workloads in response to an adjustment of a GPU power consumption limit by APT 234. For example, APT 234 may decrease the power consumption limit of GPU 212, for example, in response to a high operating temperature as discussed above. AWT 236 may then determine, based on received telemetry data, that GPU 212 has a lower power limit and lower processing performance than GPU 222. In response, the AWT 236 may redistribute a portion of GPU 212's processing workload to GPU 222, which currently shows a high power limit and higher processing performance than GPU 212. Such redistribution may have the effect of easing the processing burden on GPU 212, leading to a more equally distributed processing workload.

FIG. 3 illustrates a flow chart of an example process 300 for adjusting the performance of processing units based on workload to improve energy efficiency, in accordance with embodiments of the present disclosure. The process 300 is operable in the context of a distributed system including a plurality of processing units (e.g., GPUS 120, 212, 222 in FIGS. 1 and 2), and is performed by a computing device (e.g., management controller 112, 230).

As shown, at 302, an initial power limit is configured for each processing unit in the distributed system. In some cases, the processing unit may be a graphics processing unit (GPU), a tensor processing unit (TPU), or a data processing unit (DPU).

At 304, processing of a workload by the plurality of processing units in the distributed system is initiated, wherein the workload is associated with a target workload performance level. In some cases, the workload is a training task for an image processing model, and the target workload performance level is a number of images processed per second. In some implementations, the workload is a training task for a large language model (LLM), and the target workload performance level is a number of tokens processed per second.

The actions at 306, 308, and 310 are performed during the processing of the workload. At 306, a peak workload performance level associated with the processing of the workload is identified based on telemetry data received from the plurality of processing units in the distributed system.

At 308, it is determined that the peak workload performance level is less than the target workload performance level.

At 310, in response to determining that the peak workload performance level is less than the target workload performance level, an increased power limit is configured for at least a portion of the processing units in the distributed system, wherein the increased power limit is greater than the initial power limit.

In some implementations, the workload is a first workload, the target workload performance level is a first target workload performance level, and the process 300 further includes configuring the initial power limit for each processing unit in the distributed system; initiating, by a computing device, processing of a second workload by plurality of processing units in the distributed system, wherein the second workload is associated with a second target workload performance level; during the processing of the second workload:

identifying a peak workload performance level associated with the processing of the second workload; determining that the peak workload performance level associated with the processing of the second workload is greater than the second target workload performance level; and in response to determining that the peak workload performance level is greater than the second target workload performance level, configuring a decreased power limit for at least a portion of the processing units in the distributed system, wherein the decreased power limit is less than the initial power limit.

In some implementations, the process 300 further includes in response to determining that the peak workload performance level is less than the target workload performance level, modifying a scheduling configuration for the processing of the workload to reassign at least a portion of the workload that is being processed by a first processing unit that is operating at a power level near the initial power limit to a second processing unit that that is operating at a power level below the initial power limit.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method for improving energy efficiency in a distributed system including a plurality of processing units, the method comprising:

configuring, by a computing device, an initial power limit for each processing unit in the distributed system;

initiating, by the computing device, processing of a workload by plurality of processing units in the distributed system, wherein the workload is associated with a target workload performance level;

during the processing of the workload:

identifying, by the computing device, a peak workload performance level associated with the processing of the workload based on telemetry data received from the plurality of processing units in the distributed system;

determining, by the computing device, that the peak workload performance level is less than the target workload performance level; and in response to determining that the peak workload performance level is less than the target workload performance level, configuring, by the computing device, an increased power limit for at least a portion of the processing units in the distributed system, wherein the increased power limit is greater than the initial power limit.

2. The method of claim 1, wherein the workload is a first workload, the target workload performance level is a first target workload performance level, and the method further comprising:

configuring, by the computing device, the initial power limit for each processing unit in the distributed system;

initiating, by the computing device, processing of a second workload by plurality of processing units in the distributed system, wherein the second workload is associated with a second target workload performance level;

during the processing of the second workload:

identifying, by the computing device, a peak workload performance level associated with the processing of the second workload;

determining, by the computing device, that the peak workload performance level associated with the processing of the second workload is greater than the second target workload performance level; and in response to determining that the peak workload performance level is greater than the second target workload performance level, configuring, by the computing device, a decreased power limit for at least a portion of the processing units in the distributed system, wherein the decreased power limit is less than the initial power limit.

3. The method of claim 1, wherein the processing unit is a graphics processing unit (GPU).

4. The method of claim 1, wherein the processing unit is a data processing unit (DPU).

5. The method of claim 1, wherein the processing unit is a tensor processing unit (TPU).

6. The method of claim 1, wherein the workload is a training task for an image processing model, and the target workload performance level is a number of images processed per second.

7. The method of claim 1, wherein the workload is a training task for a large language model (LLM), and the target workload performance level is a number of tokens processed per second.

8. The method of claim 1, further comprising:

in response to determining that the peak workload performance level is less than the target workload performance level, modifying, by the computing device, a scheduling configuration for the processing of the workload to reassign at least a portion of the workload that is being processed by a first processing unit that is operating at a power level near the initial power limit to a second processing unit that that is operating at a power level below the initial power limit.

9. A system for improving energy efficiency in a distributed system including a plurality of processing units comprising:

a computer system including at least one processor and a memory, and configured to perform operations including:

configuring an initial power limit for each processing unit in the distributed system;

initiating processing of a workload by plurality of processing units in the distributed system, wherein the workload is associated with a target workload performance level;

during the processing of the workload:

identifying a peak workload performance level associated with the processing of the workload based on telemetry data received from the plurality of processing units in the distributed system;

determining that the peak workload performance level is less than the target workload performance level; and in response to determining that the peak workload performance level is less than the target workload performance level, configuring an increased power limit for at least a portion of the processing units in the distributed system, wherein the increased power limit is greater than the initial power limit.

10. The system of claim 9, wherein the workload is a first workload, the target workload performance level is a first target workload performance level, and the operations further comprising:

configuring the initial power limit for each processing unit in the distributed system;

initiating processing of a second workload by plurality of processing units in the distributed system, wherein the second workload is associated with a second target workload performance level;

during the processing of the second workload:

a peak workload performance level identifying associated with the processing of the second workload;

determining that the peak workload performance level associated with the processing of the second workload is greater than the second target workload performance level; and in response to determining that the peak workload performance level is greater than the second target workload performance level, configuring a decreased power limit for at least a portion of the processing units in the distributed system, wherein the decreased power limit is less than the initial power limit.

11. The system of claim 9, wherein the processing unit is a graphics processing unit (GPU).

12. The system of claim 9, wherein the processing unit is a data processing unit (DPU).

13. The system of claim 9, wherein the processing unit is a tensor processing unit (TPU).

14. The system of claim 9, wherein the workload is a training task for an image processing model, and the target workload performance level is a number of images processed per second.

15. The system of claim 9, wherein the workload is a training task for a large language model (LLM), and the target workload performance level is a number of tokens processed per second.

16. The system of claim 9, the operations further comprising:

in response to determining that the peak workload performance level is less than the target workload performance level, modifying a scheduling configuration for the processing of the workload to reassign at least a portion of the workload that is being processed by a first processing unit that is operating at a power level near the initial power limit to a second processing unit that that is operating at a power level below the initial power limit.

17. An article of manufacture comprising a non-transitory, computer-readable medium having computer-executable instructions thereon that are executable by a processor of a computer system to perform operations for improving energy efficiency in a distributed system including a plurality of processing units, the operations comprising:

configuring an initial power limit for each processing unit in the distributed system;

initiating processing of a workload by plurality of processing units in the distributed system, wherein the workload is associated with a target workload performance level;

during the processing of the workload:

identifying a peak workload performance level associated with the processing of the workload based on telemetry data received from the plurality of processing units in the distributed system;

determining that the peak workload performance level is less than the target workload performance level; and in response to determining that the peak workload performance level is less than the target performance level, configuring an increased power limit for at least a portion of the processing units in the distributed system, wherein the increased power limit is greater than the initial power limit.

18. The article of claim 17, wherein the workload is a first workload, the target workload performance level is a first target workload performance level, and the operations further comprising:

configuring the initial power limit for each processing unit in the distributed system;

initiating processing of a second workload by plurality of processing units in the distributed system, wherein the second workload is associated with a second target workload performance level;

during the processing of the second workload:

identifying a peak workload performance level associated with the processing of the second workload;

determining that the peak workload performance level associated with the processing of the second workload is greater than the second target workload performance level; and in response to determining that the peak workload performance level is greater than the second target workload performance level, configuring a decreased power limit for at least a portion of the processing units in the distributed system, wherein the decreased power limit is less than the initial power limit.

19. The article of claim 17, wherein the processing unit is a graphics processing unit (GPU).

20. The article of claim 17, wherein the processing unit is a data processing unit (DPU).

* * * * *